United States Patent
Dietrich et al.

(10) Patent No.: US 10,119,838 B2
(45) Date of Patent: Nov. 6, 2018

(54) METHOD FOR IDENTIFYING THE POSITION OF A ROTOR OF AN ELECTRIC MOTOR, TARGET FOR DETERMINING THE POSITION OF A ROTOR OF THE ELECTRIC MOTOR AND ELECTRIC MOTOR

(71) Applicant: Schaeffler Technologies AG & Co. KG, Herzogenaurach (DE)

(72) Inventors: Markus Dietrich, Oberkirch (DE); Jurgen Gerhart, Appenweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/303,875

(22) PCT Filed: Apr. 20, 2015

(86) PCT No.: PCT/DE2015/200266
§ 371 (c)(1),
(2) Date: Oct. 13, 2016

(87) PCT Pub. No.: WO2015/165456
PCT Pub. Date: Nov. 5, 2015

(65) Prior Publication Data
US 2017/0038226 A1    Feb. 9, 2017

(30) Foreign Application Priority Data
Apr. 30, 2014 (DE) .......... 10 2014 208 204

(51) Int. Cl.
*G01D 5/20* (2006.01)
*G01D 5/14* (2006.01)
*G01D 5/22* (2006.01)
*G01D 5/24* (2006.01)

(52) U.S. Cl.
CPC .............. *G01D 5/20* (2013.01); *G01D 5/145* (2013.01); *G01D 5/2216* (2013.01); *G01D 5/24* (2013.01)

(58) Field of Classification Search
CPC ................................ G01D 5/145; G01D 5/20
USPC ....................................... 324/207.15
See application file for complete search history.

(56) References Cited

U.S. PATENT DOCUMENTS

| | | | |
|---|---|---|---|
| 8,207,749 B2 | 6/2012 | Reime | |
| 8,657,095 B2 | 2/2014 | Eich | |
| 2014/0077795 A1* | 3/2014 | Oberhauser | G01B 7/30 324/207.25 |

FOREIGN PATENT DOCUMENTS

| | | |
|---|---|---|
| DE | 10255578 | 6/2004 |
| DE | 102005021300 | 11/2006 |
| DE | 102011014936 | 12/2011 |
| DE | 102013208986 | 12/2013 |
| JP | 2002162252 | 6/2002 |
| WO | 0155668 | 8/2001 |
| WO | 2010084000 | 7/2010 |

* cited by examiner

*Primary Examiner* — Reena Aurora
(74) *Attorney, Agent, or Firm* — Volpe and Koenig, P.C.

(57) ABSTRACT

The invention relates to a method for identifying the position of a rotor of an electric motor, in which method a target arranged on a rotor is sensed using a sensor. In a method which can be carried out cost-effectively and nevertheless delivers highly accurate sensor signals, a rotational movement of the rotor is detected using an inductive or a capacitive sensor.

14 Claims, 3 Drawing Sheets

Output Signal

METHOD FOR IDENTIFYING THE POSITION OF A ROTOR OF AN ELECTRIC MOTOR, TARGET FOR DETERMINING THE POSITION OF A ROTOR OF THE ELECTRIC MOTOR AND ELECTRIC MOTOR

BACKGROUND

The invention relates to a method for identifying the position of a rotor of an electric motor, in which a target arranged on a rotor is scanned with a sensor, as well as a target for determining a position of a rotor of an electric motor, and an electric motor.

In modern motor vehicles, particularly in passenger vehicles, increasingly automatic clutches are used, as described for example in DE 10 2011 014 936 A1, Here the clutch is moved by an electrically commutated motor. In order to determine the precise position of the clutch it is necessary to precisely determine the position of the electric motor within one rotation of the motor using a sensor for the position of a rotor.

From DE 10 2013 208 986 A1 a magnetic master ring of a sensor is known for the position of a rotor for an electrically commutated electric motor, which shows a predetermined number of magnetic poles with an alternating direction of magnetization. Such a magnetic master rings is scanned with a sensor system, which is based on the physical principles of the Hall effect, the AMR, or the GMR-measurement. The target embodied as a permanent magnet leads to high costs for the magnetic raw material, though, and is not easily integrated in the rotor system, because the magnetic material is very brittle and expansion coefficients are given here, which are dependent on the direction and are very different for synthetic materials and metals.

In such sensor systems for the position of a rotor any change of the distance between the target and the sensor, for example caused by the swiveling rotor shafts or any flaws of the magnetization, severely influence the measuring signal.

A method for the inductive generation of an electric measuring signals is known from WO 2010/084000 A1 depending on a parameter to be measured, such as for determining the path and/or the position in space and/or material features of a test body to be detected.

SUMMARY

The invention is therefore based on the objective of providing a method for determining the position of a rotor of an electric motor and an electric motor, in which a determination of the position of the rotor can be ensured in a cost-effective manner and yet using a reliable measuring signal of a sensor.

According to the invention the objective is attained in that the position of the rotor is detected during the rotary motion of the rotor with an inductive or a capacitive sensor. This is advantageous in that here a target which is made from an expensive material can be dispensed with. In spite of this cost-effective variant, using inductive and capacitive sensors allows the precise determination of the position of the rotor of the electric motor during a rotation of the electric motor.

Advantageously the position of the rotor is detected by measuring the distance between a target and the sensor changing by the rotary motion of the rotor. This allows in a particularly robust design the reliable measurement of a highly precise sensor signal.

Alternatively, the position of the rotor can also be determined by scanning a projected area formed by a defined unambiguous geometric shape. Here, too, non-magnetic and cost-effective materials are used, which considerably reduces the expenses of the measuring method.

A further development of the invention relates to a target for the determination of a position of a rotor, preferably an electric motor, which can be scanned by a sensor. A target in which a reliable measuring signal can be easily scanned is characterized by a geometric shape unambiguous over the rotation of the rotor. With this embodiment any rotation of the electric motor, which is mechanically equivalent to an angular change of the rotor shaft by 360°, is clearly defined by the changing shape such that an unambiguous relationship can be generated to the position of the rotor shaft during a rotation thereof.

In one embodiment, the defined unambiguous geometric shape of the target is formed in a three-dimensional fashion and extends along the axis of rotation of the rotor, with the sensor detecting a changing distance between the target and the sensor caused by the rotary motion of the rotor. In a three-dimensional geometric shape of the target it must be ensured that the distance changes at every angle of distortion of the rotor shaft in order to allow generating an unambiguous relationship between the target and the sensor signals.

Advantageously the three-dimensional shape of the target is embodied in a helical form, with its pitch over a rotary angle of 360° continuously or gradually increases or decreases. This linearization ensures the unambiguous allocation of the position of the rotor shaft in reference to the sensor signal required. Simultaneously the initial signal of the sensor can be considered here, which can be processed in an analog or digital fashion.

In another embodiment the defined unambiguous geometric shape can be arranged on a substrate comprising an electrically conductive material, with the electrically non-conductive geometric shape partially covering the substrate. By this only partial coverage of the electrically conductive substrate by the two-dimensional shape, here an inductive signature is generated which hereinafter shall be called the projected area, by which the sensor can unambiguously detect the position of the rotor during a rotation of the substrate.

Advantageously the two-dimensional shape of the target is embodied as an Archimedean screw. The sensor is here only sensitive with regards to the projected area, which results in a reliable detection of the position of the rotor.

Another variant of the invention relates to an electric motor, preferably an electrically commutated motor, comprising a rotor to be moved with a rotor shaft, at which a target is fastened in a torque-proof fashion, which can be scanned by a sensor. In an electric motor, using cost-effective materials and in spite of the low cost generating a reliable sensor signal, the target is arranged at a face of the rotor shaft and shows over a rotation of the rotor shaft an unambiguously changing geometric shape, which can be scanned by the sensor arranged axially in reference to the rotor shaft and aligned to the facial area.

Advantageously the sensor is embodied as an inductive or capacitive sensor.

BRIEF DESCRIPTION OF THE DRAWINGS

The invention allows numerous embodiments. Two of which shall be explained in greater detail based on the figures shown in the drawings.

Shown are.

Identical features are marked with the same reference characters.

DETAILED DESCRIPTION OF THE PREFERRED EMBODIMENTS

Figure 1:
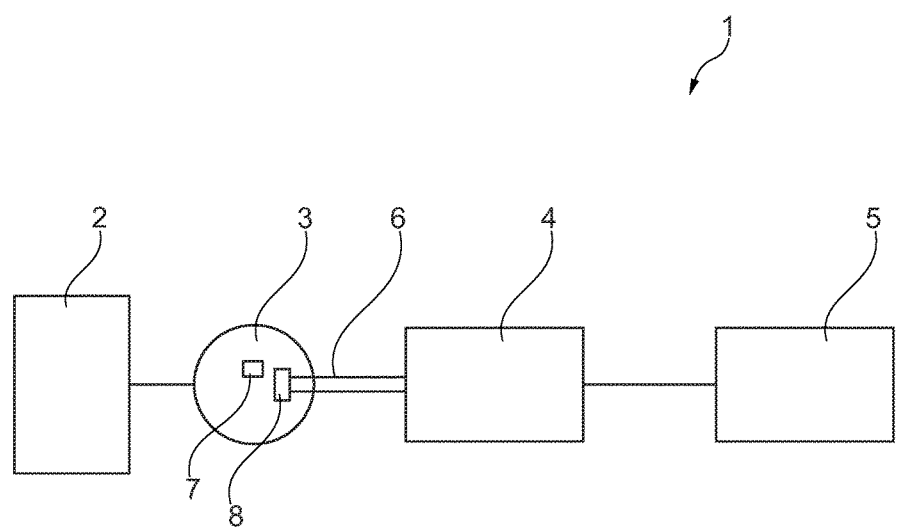
FIG. 1 an illustration of the principle of an automatic clutch in a motor vehicle, FIG. 2 a first exemplary embodiment of the target according to the invention, FIG. 3 an output signal of an inductive sensor, and FIG. 4 a second exemplary embodiment of the target according to the invention.

FIG. 1 is an illustration of a principle of an automatic clutch operation system 1 as used in motor vehicles. The clutch operating system 1 comprises here a control device 2, which controls an electric motor 3, which can be electrically commutated. The electric motor 3 is connected to a drive 4 in the form of a threaded spindle, which in turn leads to the clutch actuation device 5. By controlling the electric motor 3 via the control device 2 a rotor of the electric motor 3 is set into a rotary motion, which is transferred to the drive 4. The rotary motion is converted by the drive 4 into a linear motion, by which the clutch is moved that is included in the clutch actuating device 5, not shown in greater detail. An inductive sensor 7 is arranged axially aligned in reference to the rotor shaft 6 at the axial end face of the rotor shaft 6, which faces away from the drive 4. This sensor 7 detects here the surface of the axial end face of the rotor shaft 6, on which a target 8 is arranged.

Figure 2:
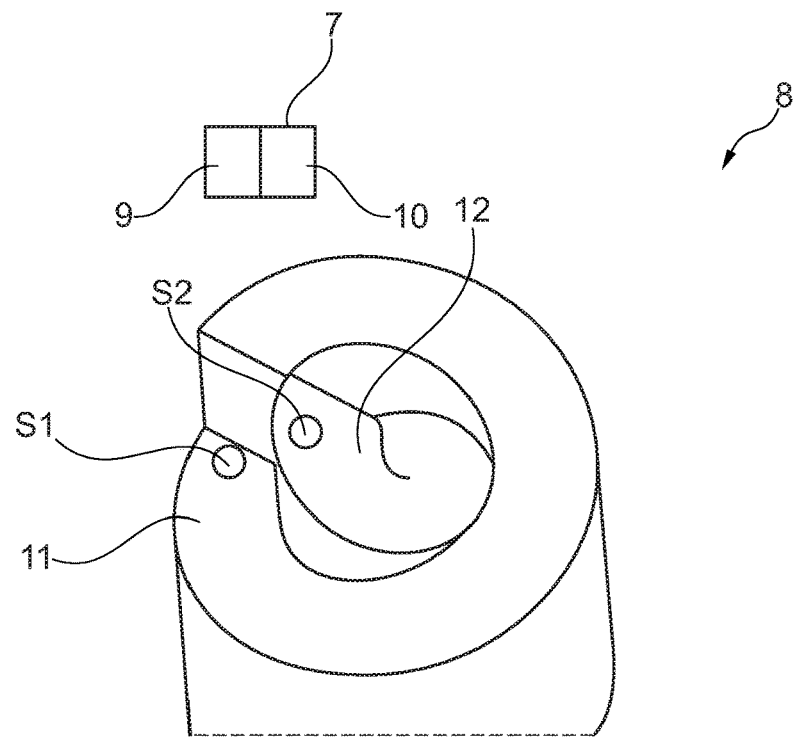
Figure 3:
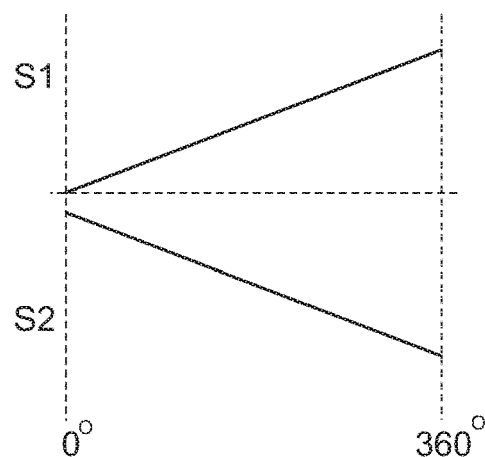

FIG. 2 shows a first exemplary embodiment of the target 8. The target 8 fastened on the axial end face of the rotor shaft 6 is embodied in a helical fashion, with the pitch 12 of the target 8 linearly dropping over a rotation of the rotor shaft 6 by 360°. The inductive sensor 7 detects this change in pitch, which results in a change of the distance between the axial end face of the rotor shaft 6 and the sensor 7 over the course of one rotation by 360°. In order to eliminate any tolerances from the rotor position, here a difference measurement of two sensor heads 9, 10 of the inductive sensor 7 may be used as well. For this purpose the target 8 shows two opposite pitches 11, 12, with each pitch 11, 12 being scanned by another sensor head 9, 10. The sensitive points of the two sensor heads 9, 10 are marked S1 and S2 in FIG. 2. The sensor heads 9, 10 emit output signals shown in FIG. 3. Over the course of one rotation each sensor head 9, 10 emits one linear output signal. The distance value between the pitch 11, 12 of the target 8 and the sensor 7 is here equivalent to the angle of rotation. The two individual measurements of the two opposite pitches 11, 12 are scaled to the total distance of the two sensor heads 9, 10.

Figure 4:
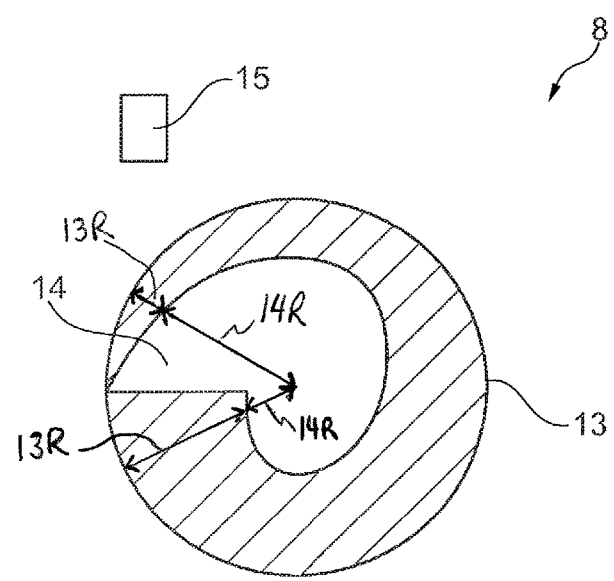

FIG. 4 shows a second exemplary embodiment of the target 8 according to the invention. An axial end face of the rotor shaft 6 is partially coated with an electrically conductive material 13, with the rotor shaft 6 itself comprising an isolating base material, such as plastic. In addition to the coating with an electrically conductive material 13 here vapor-deposition of the face of the rotor shaft 6 is also possible. A two-dimensional geometric shape 14 is formed within the electrically conductive material 13, for example an Archimedean screw. This two-dimensional shape 14 is made from an electrically non-conductive material. This Archimedean screw is arranged on the face such that the sensor 15 scanning the face detects only little electrically conductive material 13 at 0° and thus emits only a small output signal, while at a rotation of 360° of the rotor shaft 6 it scans a large area of the electrically conductive material 13, causing the inductive sensor 15 to emit a great output signal. The sensitive point in which the inductive sensor 15 scans the face is determined depending on the application, however it must be ensured that an unambiguous allocation of the face is detected over a rotation of the rotor shaft 6. The inductive sensor 15 is here only sensitive with respect to the projected area of the electrically conductive material. In other words, as shown in FIG. 4, a radial extent 14R of the electrically non-conductive unambiguous geometric shape 14 is inversely proportional to a radial extent 13R of the defined unambiguous geometric shape of the electrically conductive material 13 about an axis of rotation of the rotor 6.

It applies for both embodiments explained that the mechanical 360° of the rotation of the rotor shaft is provided with a changing shape. The mechanical 360° can also be divided by polar pairs and accordingly the number of sensor areas can be implemented over the mechanical 360°. Based on this advantageous determination of the position of the electric motor 3 the commutation is to be considerably improved. A sensor for the position of the rotor for commutating and determination of the position of the electrically commutated electric motor is therefore easily possible in an actuator using inductive and capacitive measurements. Here, this method offers the advantage of operating without a permanent magnet and thus disturbing influences are eliminated, such as change of position in the vertical and tangential direction, in the sensor system of the position of the rotor. This method can be used with the special targets for the detection of angles.

LIST OF REFERENCE CHARACTERS 1 clutch operating system
2 control device
3 electric motor
4 transmission
5 clutch actuating device
6 rotor shaft
7 inductive sensor
8 target
9 sensor head
10 sensor head
11 pitch of the three-dimensional shape
12 pitch of the three-dimensional shape
13 electrically conductive material
14 two-dimensional shape
15 inductive sensor

The invention claimed is:

1. A target for determining a position of a rotor, comprising a geometric shape that is unambiguous over a rotation of the rotor and is scannable using a sensor, and
    an electrically conductive material defines the unambiguous geometric shape and is arranged on a substrate.

2. The target according to claim 1, wherein an electrically non-conductive geometric shape partially covers the substrate.

3. The target according to claim 2, wherein a radial extent of the electrically non-conductive unambiguous geometric shape is inversely proportional to a radial extent of the defined unambiguous geometric shape about an axis of rotation of the rotor.

4. The target according to claim 2, wherein the electrically non-conductive geometric shape is unambiguous.

5. The target according to claim 1, wherein the geometric shape is embodied as an Archimedean screw.

6. An electric motor, comprising a rotor moving at a rotor shaft, on which the target according to claim 1 is arranged in a torque-proof fashion, a sensor which scans the target, the target is arranged at an axial end face of the rotor shaft, and the sensor is aligned axially in reference to the rotor shaft towards the axial end face.

7. The electric motor according to claim 6, wherein the sensor is embodied as an inductive or capacitive sensor.

8. The target according to claim 1, wherein the substrate is an axial end face of the rotor.

9. The target according to claim 1, wherein the defined unambiguous geometric shape is two dimensional.

10. A system for determining a position of a rotor, comprising
   the target of claim 1, wherein the unambiguous geometric shape comprises a first three-dimensional shape extending along an axis of rotation of the rotor, and a second-three dimensional shape extending along an axis of rotation of the rotor;
   a first sensor head being adapted to detect a distance between the first three-dimensional shape and the first sensor head that changes due to a rotary motion of the rotor; and
   a second sensor head being adapted to detect a distance between the second three-dimensional shape and the second sensor head that changes due to the rotary motion of the rotor.

11. The system according to claim 10, wherein the first three-dimensional geometric shape and the second three-dimensional shape are both unambiguous over a rotation of the rotor.

12. The target according to claim 10, wherein the first three-dimensional shape is embodied as a helix, having a first pitch continuously or gradually increasing or decreasing within an angle of 360°.

13. The target according to claim 12, wherein the second three-dimensional shape is embodied as a helix, having a second pitch continuously or gradually increasing or decreasing within an angle of 360°, wherein the second pitch is opposite the first pitch.

14. The target according to claim 10, wherein the second three-dimensional shape is inverse to the first three-dimensional shape.

* * * * *